United States Patent [19]
Okada et al.

[11] Patent Number: 4,617,335
[45] Date of Patent: Oct. 14, 1986

[54] METHOD FOR IMPROVING MOLD RELEASABILITY OF A POLYMERIC MATERIAL

[75] Inventors: Fumio Okada; Toshio Oba; Morizo Nakazato; Kenichi Isobe, all of Gunma, Japan

[73] Assignee: Shin-Etsu Chemical Co., Ltd., Tokyo, Japan

[21] Appl. No.: 758,149

[22] Filed: Jul. 23, 1985

[30] Foreign Application Priority Data

Jul. 24, 1984 [JP] Japan ............................... 59-153555

[51] Int. Cl.⁴ ............................................... C08K 5/24
[52] U.S. Cl. ................................................... 524/265
[58] Field of Search ......................................... 524/265

[56] References Cited

U.S. PATENT DOCUMENTS

| | | | |
|---|---|---|---|
| 3,585,230 | 6/1971 | Woycheshin et al. | 524/265 |
| 3,883,468 | 5/1975 | Schmidt et al. | 524/265 |
| 4,146,511 | 3/1979 | Moriya et al. | 524/265 |
| 4,332,715 | 6/1982 | Ona et al. | 524/265 |
| 4,498,929 | 2/1985 | Robertson | 524/265 |

FOREIGN PATENT DOCUMENTS

| | | | |
|---|---|---|---|
| 0045641 | 2/1982 | European Pat. Off. | 524/265 |

*Primary Examiner*—Joseph L. Schofer
*Assistant Examiner*—J. M. Reddick
*Attorney, Agent, or Firm*—Toren, McGeady, Stanger, Goldberg & Kiel

[57] ABSTRACT

The invention provides an efficient method for releasing a shaped body of a polymeric material such as a foamed polyurethane resin from a mold in which the body has been molded without the problem of adhesion to the mold. The inventive method comprises admixing the polymeric material with a specific organopolysiloxane represented by the structural formula $$R^1{}_3Si—O—(SiR^2{}_2—O)_m(SiR^2A—O)_nSiR^1{}_3,$$

in which A is a substituent group represented by the general formula $—C_xH_{2x}—O—R$, R being a monovalent hydrocarbon group having 8 to 30 carbon atoms but free from terminal unsaturation and x being zero or a positive integer not exceeding 4, $R^1$ is a monovalent hydrocarbon group or the same group as A, $R^2$ is a hydrogen atom or the same group as $R^1$, and m and n are each zero or a positive integer with the proviso that at least one group denoted by A is contained in a molecule of the organopolysiloxane.

8 Claims, No Drawings

METHOD FOR IMPROVING MOLD RELEASABILITY OF A POLYMERIC MATERIAL

BACKGROUND OF THE INVENTION

The present invention relates to a method for improving the mold releasability of a polymeric material such as thermosetting and thermoplastic resins and rubbers. More particularly, the invetion relates to a method for improving the mold releasability of a polymeric material by admixing the polymeric material to be molded with a specific organosilicon compound as an internal mold release agent.

It is conventional in the molding process of a polymeric material including thermosetting and thermoplastic resins such as vinyl chloride resins, acrylic resins, epoxy resins, urethane resins and the like and rubbers such as natural rubber and various kinds of synthetic rubbers to coat the inner walls of the metal mold with a mold release agent by spraying or brushing with an object to facilitate releasing of the molded polymeric body from the metal mold. The mold release agents currently used in the above mentioned purpose are mostly prepared on the base of a petroleum wax, a silicone or a combination thereof. The method of coating of the metal mold with a mold release agent has several problems. For example, the effect obtained by the coating is not lasting so that the inner walls of a metal mold must be coated frequently when the metal mold is used repeatedly so that the productivity of the molding process cannot be high enough due to the interruption of the molding process for coating of the metal mold with a mold release agent. Further, the metal mold is unavoidably stained by the accumulation of the decomposed mold release agent so that the metal mold must be cleaned periodically taking a great deal of time and labor. The mold release agent scattered in the spray coating of the metal mold may cause envionmental contamination. In addition, the surface of the shaped body molded in a metal mold coated with a mold release agent not always can be satisfactory in respect of the luster and feeling in touch though dependent on the types of the mold release agent and the amount thereof deposited on the surface of the shaped body.

Alternatively, it is also proposed to facilitate mold releasing of a polymeric shaped body from a metal mold by admixing the polymeric material before molding with a mold release agent, which is called an internal mold release agent. Use of such an internal mold release agent is also not free from several problems. For example, certain internal mold release agents contain various functional groups in the molecular structure so that the resins and rubbers admixed therewith may be reacted with the functional groups so that various adverse effects are caused on the properties of the shaped polymeric bodies. In particular, difficult problems are involved in the use of an organopolysiloxane-based internal mold release agent admixed with polyurethane foams because the foams are sometimes destroyed or the uniformity of the cellular foam structure is decreased.

SUMMARY OF THE INVENTION

It is therefore an object of the present invention to provide a novel method for improving the mold releasability of a polymeric material from a metal mold in which the polymeric material is molded free from the above described disadvantages and problems.

Another object of the invention is to provide an internal mold release agent which can be admixed in any polymeric material without causing the above described problems and disadvantages in the conventional internal mold release agents, in particular, when it is used for shaping polyurethane foams.

Thus, the method of the present invention for improving the mold releasability of a polymeric material from a metal mold in which the polymeric material has been molded comprises admixing the polymeric material with an organopolysiloxane having, in a molecule, at least one group of the general formula $$-C_xH_{2x}-O-R, \qquad (I)$$

in which R is a monovalent hydrocarbon group having 8 to 30 carbon atoms and containing no terminal unsaturation, bonded to the silicon atom and x is zero or a positive integer not exceeding 4.

DETAILED DESCRIPTION OF THE PREFERRED EMBODIMENTS

As is understood from the above description, the scope of the inventive method is in the admixture of the polymeric material to be molded with a specific organopolysiloxane compound, which is quite inert to the isocyanate groups in the foamable urethane resin composition and the organopolysiloxane compound is never affected by the curing catalyst contained in the foamable urethane resin composition so that very satisfactory results can be obtained in the fabrication of foamed polyurethane resin products. The usefulness of the above specified organopolysiloxane as the principal ingredient of an internal mold release agent is of course not limited to foamable urethane resin compositions but equally satisfactory results can be obtained with other resins such as acrylic and epoxy resins as well as rubbers.

The organopolysiloxane compound as the principal ingredient in the internal mold release agent according to the inventive method is not particularly limitative in respect of the molecular structure thereof including straightly linear, branched and cyclic ones provided that it has at least one substituent group represented by the general formula (I) bonded to the silicon atom in a molecule. The substituent group of the formula (I) may be bonded to a silicon atom at any position of the organopolysiloxane molecule including the terminal silicon atoms and the silicon atoms at an intermediate position of the molecular chain.

When the organopolysiloxane has a linear molecular structure, it is represented by the structural formula $$R^1_3Si-O-(SiR^2_2-O)_m-(SiR^2A-O)_nSiR^1_3, \qquad (II)$$

in which A is the substituent group of the general formula (I) given above. $R^1$ is a monovalent hydrocarbon group selected from the class consisting of alkyl groups, e.g. methyl, ethyl and propyl groups, alkenyl groups, e.g. vinyl and allyl groups, aryl groups, e.g. phenyl and tolyl groups, and cycloalkyl groups, e.g. cyclohexyl group, as well as those substituted groups obtained by the replacement of a part or all of the hydrogen atoms in the above named hydrocarbon groups with substituent groups such as halogen atoms, cyano groups and the like, e.g. chloromethyl, cyanomethyl and 3,3,3-trifluoropropyl group, or the same group as A, $R^2$ is a hydrogen atom or the same group as $R^1$ and m and n are each zero or a positive integer with the proviso that at least one group A is contained in a molecule.

In the general formula (I), the group denoted by R is a monovalent, preferably aliphatic, hydrocarbon group having 8 to 30 carbon atoms and containing no terminal unsaturation. Preferably, the group R has from 12 to 18 carbon atoms. When the group R has no unsaturation, lauryl, myristyl, palmityl and stearyl groups are preferred as the group R. When the group R has one or more unsaturated bonds in a molecule, though at intermediate positions, linoleyl and oleyl groups are preferred as the group R. The suffix x is zero or a positive integer not exceeding 4 but it is preferably 3.

Several of the particular examples of the organopolysiloxane compound are those expressed by the following structural formulas, denoting a methyl and a phenyl group by the symbols of Me and Ph, respectively:

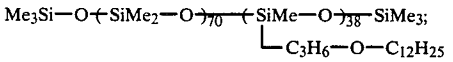

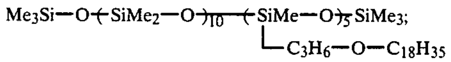

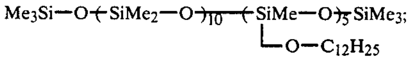

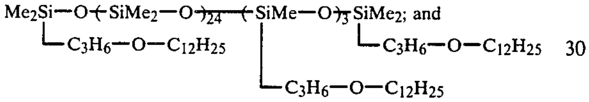

$$PhSi[(O-SiMe_2)_6O-SiMe_2-C_3H_6-O-C_{18}H_{35}]_3.$$

It is preferable that at least 10% or, more preferably, from 25 to 50% of the silicon atoms in a molecule of the organopolysiloxane have the substituent groups A, i.e. the group represented by the general formula (I), bonded thereto. Further, it is preferable that at least 50% by moles of the organic groups other than A in a molecule should be methyl groups. Although the organopolysiloxane may be liquid or solid at room temperature, a solid organopolysiloxane should preferably be melted beforehand and incorporated in the resin or rubber in a molten liquid form. When the organopolysiloxane is liquid, it should have a viscosity not exceeding 1,000,000 centistokes or, preferably, in the range from 10 to 500 centistokes at 25° C.

In the inventive method, the above described specific organopolysiloxane compound should be added to the resin or rubber to be molded in an amount in the range from 0.05 to 10% by weight, or preferably, from 0.1 to 5% by weight based on the amount of the resin or rubber although the exact amount should be determined depending on the type of the resin or rubber. It is optional that the resin or rubber is admixed with other conventional internal mold release agents such as fatty acids, e.g. stearic acid, or metal salts thereof, in combination with the organopolysiloxane compound. It is further optional that the metal mold, in which a polymeric material admixed with the organopolysiloxane compound is molded, is coated on the inner walls with a known mold release agent for coating use when a further increased effect of mold releasability is desired.

The above described method of the invention is particularly effective in the molding process of urethane-based polymeric materials including polyurethane foams and polyurethane rubbers although the method is generally effective in the moldig process of other resins, e.g. acrylic and epoxy resins, and rubbers. In addition to the effect in the mold releasability, articles shaped of a polymeric material admixed with the organopolysiloxane compound are imparted with insusceptibility to blocking or sticking of the surfaces with each other. Similar anti-blocking effect is also obtained when a coating composition, e.g. paint, is admixed with the organopolysiloxane compound.

In the following, the method of the invention is described in more detail by way of Examples. In the Examples below, the expression of "parts" always refers to "parts by weight".

EXAMPLE 1

An organopolysiloxane compound usable as the internal mold release agent and expressed by the structural formula

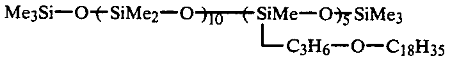

was prepared by heating a mixture composed of 100 parts of a methyl hydrogen polysiloxane expressed by the formula $$Me_3Si-O(SiMe_2-O)_{10}(SiHMe-O)_5SiMe_3$$

and 65 parts of oleyl allyl ether at 90° C. for 5 hours in the presence of a platinum catalyst.

In the next place, a unform mixture of 100 parts of a polyol compound (Takenate SI-50R, a product by Takeda Yakuhin Kogyo Co.) and 2 parts of the above prepared organopolysiloxane was admixed and uniformly blended with 95 parts of an isocyanate compound (Takenate SI-13P, a product by the same company supra) to give a molar ratio of NCO/OH of 105%. The polyol/isocyanate blend was poured into an aluminum-made mold heated in advance at 50° C. and kept there for 60 seconds to be cured into a polyurethane elastomer body which could easily be taken out of the mold.

For comparison, the same molding procedure was undertaken as above excepting the admixture of the organopolysiloxane compound to find an extreme difficulty in taking the cured polyurethane elastomer body out of the aluminum mold without causing partial destruction of the body.

The cured polyurethane elastomer body prepared with admixture of the orgnopolysiloxane compound had mechanical properties of: 200 kg/cm$^2$ of tensile strength; 200% of ultimate elongation; and 80 kg/cm of tear strength. These values are none of inferiority to those obtained without addition of the organopolysiloxane.

EXAMPLE 2

A foamable polyurethane resin composition was prepared by uniformly blending 20 parts of a polypropyleneglycol triol having an average molecular weight of about 3000, 80 parts of a polypropyleneglycol polyol (Actocol 52-460, a product by Takeda Takuhin Kogyo Co.), 10 parts of Freon 11 (a product name by DuPont Co.), 96.5 parts of a polyisocyanate having an index of the NCO/OH ratio of 105% (Millionate MR, a product by Nippon Polyurethane Co.), 1.0 part of N,N,N',N'-tetramethyl hexenediamine and 5 parts of an organopolysiloxane expressed by the formula

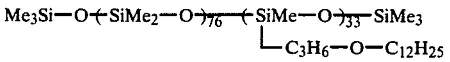

and the blend was poured into an aluminum-made mold heated in advance at 50° C. to be expanded therein into a foamed polyurethane resin after curing at room temperature for 1 hour. When the aluminum-made mold was disassembled, the rigid foamed polyurethane body could readily be taken out of the mold.

EXAMPLE 3

A foamable polyurethane resin composition was prepared by uniformly blending 100 parts of a polypropyleneglycol polyol (Actocol MF-05, a product by Takeda Yakuhim Kogyo Co.), 20 parts of water, 1.0 part of N,N,N',N'-tetramethyl hexenediamine, 28.4 parts of a 20:80 by weight mixture of tolylene diisocyanate anf Millionate MR (See Example 2), a foam conditioning agent (F-121, a product by Shin-Etsu Chemical Co.) and 5 parts of an organopolysiloxane expressed by the formula

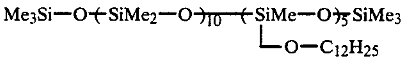

and the blend was poured into an aluminum-made mold heated in advance to 40° C. to be expanded therein into a foamed polyurethane resin after curing at room temperature for 1 hour. When the aluminum-made mold was disassembled, the semi-rigid foamed polyurethane body could readily be taken out of the aluminum mold.

EXAMPLE 4

An epoxy resin composition was prepared by uniformly blending 100 parts of an epoxy resin (Epikote 828, a product by Shell Chemical Co.), 12 parts of triethylene tetramine and 1 part of an organopolysiloxane expressed by the formula

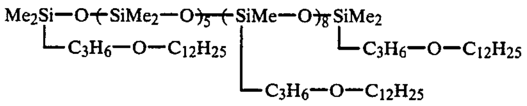

and the resin blend was poured into an aluminum-made dish to be cured therein by first keeping at room temperature for 2 hours and then heating at 115° C. for 30 minutes. The thus cured epoxy resin body could readily be taken out of the aluminum-made dish.

What is claimed is:

1. A method for improving the mold releaseability of a polymeric material from a metal mold in which the polymeric material has been molded which comprises admixing the polymeric material with an organopolysiloxane having, in a molecule, at least one group of the general formula $$-C_xH_{2x}-O-R,$$

in which R is a monovalent hydrocarbon group having 8 to 30 carbon atoms and containing no terminal unsaturation and x is zero or a positive integer not exceeding 4, bonded to the silicon atom.

2. The method for improving the mold releasability of a polymeric material as claimed in claim 1 wherein the organopolysiloxane is a diorganopolysiloxane represented by the general formula $$R^1_3Si-O(SiR^2_2\text{-}O)_m(SiR^2A-O)_nSiR^1_3,$$

in which A is a substituent group represented by the general formula $-C_xH_{2x}-O-R$, R and x each having the meaning as defined above, $R^1$ is a monovalent hydrocarbon group or the same group as A, $R^2$ is a hydrogen atom or the same group as $R^1$, and m and n are each zero or a positive integer with the proviso that at least one group denoted by A is contained in a molecule.

3. The method for improving the mold releasability of a polymeric material as claimed in claim 1 wherein the group denoted by R is selected from the class consisting of lauryl, myristyl, stearyl, oleyl and linoleyl groups.

4. The method for improving the mold releasability of a polymeric material as claimed in claim 1 wherein the suffix x is 3.

5. The method for improving the mold releasability of a polymeric material as claimed in claim 1 wherein the polymeric material is admixed with the organopolysiloxane in an amount in the range from 0.05 to 10% by weight.

6. The method for improving the mold releasability of a polymeric material as claimed in claim 2 wherein from 25 to 50% in number of the silicon atoms in the organopolysiloxane each have a group denoted by A bonded thereto.

7. The method for improving the mold releasability of a polymeric material as claimed in claim 2 wherein at least 50% by moles of the groups denoted in $R^1$ and $R^2$ other than the groups denoted by A are methyl groups.

8. The method for improving the mold releasability of a polymeric material as claimed in claim 1 wherein the organopolysiloxane has a viscosity in the range from 10 to 500 centistokes at 25° C.

* * * * *